(12) United States Patent
Hoek et al.

(10) Patent No.: US 8,497,310 B2
(45) Date of Patent: Jul. 30, 2013

(54) INTEGRATED PROCESS AND REACTOR ARRANGEMENT FOR HYDROCARBON SYNTHESIS

(75) Inventors: Arend Hoek, Amsterdam (NL); Hans Michiel Huisman, Rotterdam (NL)

(73) Assignee: Shell Oil Company, Houston, TX (US)

( * ) Notice: Subject to any disclaimer, the term of this patent is extended or adjusted under 35 U.S.C. 154(b) by 549 days.

(21) Appl. No.: 12/643,706

(22) Filed: Dec. 21, 2009

(65) Prior Publication Data
US 2010/0160461 A1 Jun. 24, 2010

(30) Foreign Application Priority Data
Dec. 22, 2008 (EP) .................................... 08172587

(51) Int. Cl.
*C07C 27/00* (2006.01)
(52) U.S. Cl.
USPC .......................................... 518/706; 518/700
(58) Field of Classification Search
USPC ................................................ 518/700, 706
See application file for complete search history.

(56) References Cited

U.S. PATENT DOCUMENTS

| | | | | |
|---|---|---|---|---|
| 6,156,809 | A * | 12/2000 | Clark et al. ................. | 518/719 |
| 2003/0027875 | A1 | 2/2003 | Zhang et al. ................ | 518/728 |

FOREIGN PATENT DOCUMENTS

| | | |
|---|---|---|
| WO | WO9900191 | 1/1999 |
| WO | WO2004004884 | 1/2004 |
| WO | WO2007009955 | 1/2007 |
| WO | WO2007065904 | 6/2007 |

* cited by examiner

*Primary Examiner* — Jafar Parsa

(57) ABSTRACT

The present invention relates to a process for producing normally gaseous, normally liquid and optionally normally solid hydrocarbons during a production cycle (i.e. between regenerations or between start-up with freshly loaded catalyst and the first regeneration) by catalytic conversion of synthesis gas in a multiple reactor arrangement comprising at least two parallel operating reactors containing a catalyst capable of converting synthesis gas to hydrocarbons, and each reactor having a different relative reaction rate, wherein synthesis gas is distributed to each reactor at a feed rate proportional to the relative reaction rate in the respective reactor. It further relates to a reactor arrangement suitable for operating the process according to the invention for producing normally gaseous, normally liquid and optionally normally solid hydrocarbons during a production cycle by catalytic conversion of synthesis gas comprising at least two parallel operating reactors, each containing a catalyst, wherein the reactors are connected to a common header for the distribution of synthesis gas to the reactors, and wherein the common header comprises a distribution means for selectively controlling the amount of synthesis gas fed to each reactor.

10 Claims, No Drawings

INTEGRATED PROCESS AND REACTOR ARRANGEMENT FOR HYDROCARBON SYNTHESIS

This application claims the benefit of European Application No. 08172587.1 filed Dec. 22, 2008 which is incorporated herein by reference.

The present invention relates to an improved process for the conversion of a gaseous mixture of carbon monoxide and hydrogen, further referred to herein as synthesis gas or syngas, to a mixture of normally gaseous and normally liquid and optionally normally solid hydrocarbons and water. The present invention further relates to a reactor arrangement suitable for conducting the process.

BACKGROUND OF THE INVENTION

A number of processes are known for the conversion of synthesis gas (further referred to herein as syngas) to a mixture of normally gaseous and normally liquid and optionally normally solid hydrocarbons. An example of such a process is the Fischer Tropsch synthesis process. In this process, the syngas is usually converted over a suitable catalyst at elevated temperature and pressure into a mixture of hydrocarbon compounds, and water. The reaction affords mainly aliphatic straight-chain hydrocarbons, more specifically mostly into paraffinic compounds ranging from methane to high molecular weight molecules comprising up to 200 carbon atoms, but also branched hydrocarbons, unsaturated hydrocarbons, and primary alcohols are formed. Numerous catalysts are known for the Fischer Tropsch process, mainly based on iron or cobalt. Iron-based catalysts usually have a high tolerance for sulphur, are relatively cheap, and produce a mixture of saturated hydrocarbons, olefins, and alcohols. Cobalt-based catalysts usually provide for a higher conversion rate, and are more reactive for hydrogenation and produce therefore less unsaturated hydrocarbons and alcohols compared to iron-based catalysts.

Independently from the exact nature of the catalyst employed, its activity and selectivity for heavier hydrocarbon products degenerates successively during operation. Once a catalyst has been deactivated below a certain activity and/or selectivity level, this spent catalyst needs to be reconditioned or exchanged after a certain time of operation. The active lifetime of the catalysts thus is determined by the overall reaction rate that is achieved in a reactor unit, and can be as limited as several weeks of continuous operation in commercial installations in the case of iron-based catalysts.

Usually, increasing the temperature of the reactor in question compensates the reduction in catalyst activity. However, by raising the temperature with increasing catalyst deactivation, the amount of smaller hydrocarbon products produced increases, thus reducing the overall quality of the product mixture. For a given catalyst and syngas composition the selectivity to liquid products (as expressed by the selectivity to product having more than 5 carbon atoms in a chain, further referred to as $C_5^+$) decreases with decreasing activity (factor) when compensated by a higher temperature. Moreover, selectivity for $CO_2$ formation increases, thereby further decreasing the production of valuable $C5^+$ products, while equally reducing the efficiency of the process.

Once a catalyst has reached a certain level of deactivation, the catalyst deactivation accelerates under a constant syngas flow, and critical values may be reached requiring rapid replacement. The catalyst reactivation again often requires removal of the catalyst from the reactor vessel, thereby involving cumbersome handling of catalyst material.

The catalyst deactivation also reduces the obtainable steam temperature and pressure, and may lead to steam quality issues since the lower reaction rate leads to a lower amount of heat generated for superheating steam. Accordingly, the process according to the present invention provides for an improved process for the conversion of a gaseous mixture of carbon monoxide and hydrogen to a mixture of normally gaseous and normally liquid and optionally normally solid hydrocarbons and water, wherein the above identified disadvantages are at least reduced. It further provides for a reactor line-up that allows operating the process under optimal conditions and increased $C_5^+$ selectivity with decreased $CO_2$ production.

SUMMARY OF THE INVENTION

Accordingly, the subject invention relates to a process for producing normally gaseous, normally liquid and optionally normally solid hydrocarbons during a production cycle by catalytic conversion of synthesis gas in a multiple reactor arrangement comprising at least two parallel operating reactors having different reaction rates and each containing a catalyst capable of converting synthesis gas to hydrocarbons, wherein synthesis gas is fed at a feed rate proportional to the relative reaction rate in each reactor.

DETAILED DESCRIPTION OF THE INVENTION

A production cycle is the production between regenerations, or the production between start-up with freshly loaded catalyst and the first regeneration.

As set out above, the subject process is operated in such way that the amount of syngas fed to each reactor is distributed according to the relative reaction rate in each reactor, such that the reactor exhibiting a relative higher reaction rate receives relatively more syngas than the reactor or reactors that exhibit a relatively lower reaction rate.

The present invention has the benefit of extending the lifetime of catalyst in a specific reactor, and hence increases the period until a reactor needs to be taken off the reaction, thereby reducing the downtime of a specific reactor. Yet further, a relatively constant reaction rate can be maintained over a longer period of time for a reactor, thereby increasing the steam quality of the system, and for a longer period of time.

Yet further, the lower selectivity of an aged catalyst leading to lower quality products and increase in carbon dioxide production is reduced. By reducing the feed to a reactor in line with the relative reactor activity decreases the amount of lower molecular weight products in the product mixture; this also keeps the product mixture over several coupled reactors more constant.

During a production cycle (i.e. between regenerations or between start-up with freshly loaded catalyst and the $1^{st}$ regeneration) the activity of a hydrocarbon synthesis catalyst decreases. In order to keep the production of the reactor constant, usually the reactor temperature is increased. When the maximum allowable reactor temperature is reached, as defined by hardware constraints, product quality, selectivity and other relevant factors, the production cycle usually may be continued at constant temperature with decreasing production in this reactor.

Relative catalyst activity can be described by the Arrhenius equation (See formula I):

$$k = k0 * \exp(-Ea/RT)$$

wherein k=rate constant which can be taken for the relative activity, or working ability of the catalyst. k0 is the so-called pre-exponential factor and often used as catalyst activity, while the term "exp(−Ea/RT)" is the Arrhenius factor or exponential factor.

A decrease in catalyst activity corresponds with a decrease in k0 (deactivation). During a production cycle, k0 is continuously decreasing.

The following phenoma are usually seen when operating a Fischer-Torpsch reaction: a) a fast decrease after start-up with fresh or freshly regenerated catalyst; this is the so-called initial deactivation which levels out to the continuous deactivation; b) a more or less linear deactivation with time over the main part of the production cycle; and c) an exponential deactivation at the end of the production cycle.

In the process phases a) and b), k can be kept constant by compensating with the Arrhenius factor (i.e. by increasing the temperature). When k0 decreases without compensating with the Arrhenius factor, the work rate decreases (e.g. at the end of a production cycle, i.e. when the maximum temperature is reached in the reactor. The above formula I focuses on activity only, while the reaction kinetics also depend on the concentration of the reactants. However, given a distribution of the same syngas composition over the reactors, it is assumed that the syngas concentration at each respective reactor inlet remains the same, and hence may be included as a constant in k0.

A term often used is activity factor. This is the ratio of the actual k0 and a reference k0 (k0ref). The k0ref can relate to a certain experiment or set of experiments or to a test run in commercial equipment. Within the subject application, k0ref is defined as the average $1^{st}$ production cycle activity of a fresh catalyst. This initial activity factor for a fresh catalyst can be as high as 1.5 or 2.0, while the activity factor for a catalyst at the end of a production cycle can be as low as 0.4 Hydrocarbon synthesis reactor productivity is often defined as "space time yield" (further referred to as "STY"). STY is expressed herein in kg $Cl^+$ hydrocarbon product per $m^3$ catalyst volume per hr. STY is independent of reactor size and is also called specific reactor productivity. Accordingly, a high STY value implies a high relative catalyst work rate.

Within the subject specification, the reaction rate is defined as the increase in molar concentration of product of a reaction per unit time or the decrease in molar concentration of reactant in unit time. The reaction rate can conveniently be determined by measuring the amount of synthesis gas fed to the reactor per pass, the amount of water formed per pass, the total carbon monoxide conversion per pass, or by measuring the total reactor productivity for hydrocarbons having 5 or more carbon atoms at a given temperature and pressure.

Accordingly, the relative reactor activity preferably is expressed using the Relative Intrinsic Activity Factor (RIAF) defined in WO-A-01/96014. The RIAF is a ratio of the Arrhenius pre-exponential factor for an experimental catalyst precursor to that for a benchmark catalyst precursor. The RIAF is a dimensionless parameter which can serve as a measure of the activity per unit mass of catalyst, taking into consideration the synthesis conditions. The RIAF depends on the carbon monoxide conversion and also, inversely, on the partial pressures of carbon monoxide and hydrogen. The reaction rates in each reactor are then calculated from the activity per unit mass of catalyst employed in the reactor.

Preferably, the process is conducted at conditions under which the production of methane is minimized and a substantial portion of the hydrocarbons produced have a carbon chain length of at least 5 carbon atoms. Preferably, the amount of $C_5+$ hydrocarbons is at least 60% by weight of the total product, more preferably, at least 70% by weight, even more preferably, at least 80% by weight, most preferably at least 85% by weight.

Current commercial Fischer Tropsch reactors typically operate in two different temperature regimes. The high temperature process operates with iron catalyst at a temperature above 300° C., and is geared mainly to produce olefins and gasoline. The low temperature process, using either cobalt or iron based catalysts operating at temperatures below 300° C., is geared to produce linear waxes or diesel.

Preferably, the process according to the subject invention is a Fischer-Tropsch process. More preferably, it is carried out at a temperature in the range from 125 to 350° C., preferably 175 to 275° C., and more preferably 200 to 260° C. The pressure usually ranges from 3 to 180 bar abs., preferably from 5 to 150 bar abs., and more preferably from 5 to 80 bar abs. Hydrogen and carbon monoxide (synthesis gas) is typically fed to the respective reactor at a molar ratio in the range from 0.4 to 2.5. Preferably, the hydrogen to carbon monoxide molar ratio is in the range from 1.0 to 2.5. The gaseous hourly space velocity may vary within wide ranges and is typically in the range from 1500 to 10000 Nl/l/h, preferably in the range from 2500 to 7500 Nl/l/h.

Products of the Fischer Tropsch synthesis may range from methane to heavy paraffinic waxes. The product range usually includes light hydrocarbons methane ($CH_4$) and ethane ($C_2$), LPG ($C_3$-$C_4$), gasoline ($C_5$-$C_{12}$), diesel ($C_{13}$-$C_{22}$), and light and waxes ($C_{23}$-$C_{32}$ and >$C_{33}$, respectively), i.e. normally gaseous and normally liquid and optionally normally solid hydrocarbons. The exact nature of the hydrocarbon mixture obtained is determined by the process parameters, i.e. temperature, pressure, the kind of reactor and the catalyst employed. Reaction products liquid under the reaction conditions may be separated and removed using suitable means such as one or more filters. Internal or external filters, or a combination of both, may be employed. Gas phase products such as light hydrocarbons and water may be removed using suitable means known to the person skilled in the art.

Catalysts for the Fischer Tropsch process are well known in the art. They typically include a Group VIII metal component, preferably cobalt, iron and/or ruthenium, more preferably cobalt or iron, and most preferably cobalt. Typically, the catalyst further comprises a catalyst carrier. This carrier is preferably porous, such as a porous inorganic refractory oxide, more preferably alumina, silica, titania, zirconia or mixtures thereof. The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium. A very suitable catalyst comprises cobalt as the catalytically active metal and zirconium as a promoter. Another very suitable catalyst comprises cobalt as the catalytically active metal and manganese and/or vanadium as a promoter. The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) atomic ratio is advantageously at least 12:1.

Suitable Fischer Tropsch reactor vessels for the subject process include circulating fluidized bed reactors, fluidized bed reactors, tubular fixed bed reactors and slurry phase reactors, and combinations thereof operating in parallel banks, and/or serial set-ups, as described in WO-A-00/63141.

It will be understood that the skilled person is capable to select the most appropriate conditions for a specific reactor configuration and reaction regime. Suitable reactors for the subject process may each individually be selected from the group consisting of circulating fluidized bed reactor, fluidized bed reactor, tubular fixed bed reactor and slurry phase reactor.

Preferably, the superficial gas velocity of the synthesis gas is in the range from 0.5 to 50 cm/sec, more preferably in the range from 5 to 35 cm/sec.

Typically, the superficial liquid velocity is kept in the range from 0.001 to 4.00 cm/sec, including liquid production. It will be appreciated that the preferred range may depend on the preferred mode of operation.

According to one preferred embodiment, the superficial liquid velocity is kept in the range from 0.005 to 1.0 cm/sec.

Without wishing to be bound to any particular theory, it is believed that there are several chemical and mechanical mechanisms involved in the catalyst deactivation, as for instance described in WO-A-01/96014. Catalyst lifetime may also be decreased by mechanical attrition of catalyst particles. This occurs when the support material is too weak to withstand abrasive conditions, as for example in a slurry reactor system. Catalyst rejuvenation appears not always possible, since some of the catalyst deactivation reactions appear to be irreversible. Accordingly, the subject process provides for a method that allows optimizing catalyst use by elongating the effective lifetime of the catalyst in the reactor.

Preferably in the subject process, at least one of the reactors is a fixed bed reactor. In a further preferred embodiment of the subject process, at least one of the reactors is a slurry reactor. Yet more preferably, all reactors are fixed bed reactors or all reactors are slurry reactors due to different regimes, and catalyst fines that may affect any recycle streams.

In a different preferred embodiment of the subject process the reactor arrangement comprises at least one fixed bed reactor and at least one slurry reactor; thereby resulting in an overall product composition that allows for instance increased production of a bimodal product composition particularly useful for Diesel and Base oil products.

Preferably, the catalyst used in the subject process is a heterogeneous catalyst. More preferably, the catalyst comprises a group VIII metal, yet more preferably comprising cobalt and/or iron. The catalyst preferably is supported on a carrier. Preferably the catalyst is a Fischer-Tropsch catalyst.

Preferably, the process is conducted in such way that of from 20 to 80% by volume of the synthesis gas is fed to the reactor having the highest relative reaction rate, while the remainder of the synthesis gas is fed to the reactors having a lower reaction rate in relation to their reaction rate. Preferably, the amount of synthesis gas fed to the reactor exhibiting the lowest reaction rate is chosen sufficiently to maintain the water formed in the reactor in a gaseous state. Once a reactor has arrived at a point where the reaction rate is no longer high enough, the reactor is then taken off the syngas supply, and the catalyst is subjected to a recycling reaction, or discarded and the reactor is then filled with fresh catalyst to return to operation in due time.

The process according to the invention further preferably includes the steps of separating the obtained product mixture into normally liquid, solid and gaseous components, and preferably subjecting the normally liquid, and/or normally solid products to further refining steps. These preferably include hydroprocessing and/or catalytic dewaxing steps, resulting in mainly iso-paraffinic products such as kerosene, diesel and lubricating base oils.

Preferably, the relative reaction rate in a reactor may be determined by measuring the total carbon monoxide conversion per pass. Alternatively, or in combination with the total carbon monoxide conversion per pass, the relative reaction rate in a reactor may preferably be determined by measuring the total reactor productivity for hydrocarbons having 5 or more carbon atoms at a given temperature and pressure.

The subject invention further relates to a reactor arrangement for producing normally gaseous, normally liquid and optionally normally solid hydrocarbons during a production cycle by catalytic conversion of synthesis gas comprising at least two parallel operating reactors, each containing a catalyst, wherein the reactors are connected to a common header for the distribution of synthesis gas to the reactors, and wherein the common header comprises a distribution means for selectively controlling the amount of synthesis gas fed to each reactor.

A header has generally the meaning of a pipe from which two or more tributary pipes run. In the subject reactor arrangement, two or more parallel arranged reactor vessels share a common header for the incoming syngas supply.

Preferably, the reactor arrangement further comprises a monitoring unit for determination of the reaction rate and coupled to the distribution means, wherein the monitoring unit is equipped for measuring the product composition obtained in each reactor. Suitably, the reactor arrangement further comprising outlets connected to the reactors to collect the obtained reaction mixture, wherein the reactor outlets are connected to a common header for collecting the obtained gaseous product streams. Preferably, each reactor further comprises means containing a heat dissipation fluid. These means containing the heat dissipation fluid are preferably integrated in a secondary circuit for the generation of superheated steam. The following, non-binding experiments will illustrate the effectiveness of the claimed line-up and process:

EXAMPLE 1 AND COMPARATIVE EXAMPLE 1

The following examples were obtained by a simulation, comparing a reactor arrangement comprising two parallel reactors:

At the beginning, Reactor 1 has catalyst with activity factor 1.5; Reactor 2 has catalyst with activity factor 0.5. The reactors and their catalyst beds have equal size (200 m3 of catalyst). Furthermore it is assumed that no hardware-based reactor temperature limitation in place. The total amount and quality of the fed syngas is assumed as being constant, with an overall CO conversion of 80%.

EXAMPLE 1

Reactor 1 STY=250, Reactor 2 STY=about 150 (slightly deviating from an exact value of 150 due to differences in $CO_2$ selectivity);

COMPARATIVE EXAMPLE 1

Reactor 1 STY=200, Reactor 2 STY=200
The following results were obtained (Table 1):

|  | Example 1 | Comparative Example 1 |
|---|---|---|
| Reactor 1 activity factor | 1.5 | 1.5 |
| Reactor 2 activity factor | 0.5 | 0.5 |
| Reactor 1 STY, kg/m$^3$/h | 250 | 200 |
| Reactor 2 STY, kg/m$^3$/h | 152.4 | 200 |
| Reactor 1 fresh syngas feed t/d | 3009 | 2405 |
| Reactor 2 fresh syngas feed t/d | 1849 | 2452 |
| total fresh syngas feed, t/d | 4857 | 4857 |
| Reactor 1 C5+ production, t/d | 1121 | 908 |
| Reactor 2 C5+ production, t/d | 648 | 815 |
| total C5+ production, t/d | 1770 | 1724 |
| Reactor 1 CO$_2$ production, t/d | 22 | 12 |
| Reactor 2 CO$_2$ production, t/d | 43 | 103 |
| total CO$_2$ production, t/d | 65 | 114 |

Calculating reactor operating according to the invention leads to a 2.7% increase in liquid hydrocarbons (C5+) production vs. the comparative example 1. This represents a significant improvement of the reaction efficiency. Furthermore, operating the reactors according to the invention leads to a 43% reduction in CO$_2$ production vs. comparative example 1.

What is claimed is:

1. A process for producing normally gaseous, normally liquid and optionally normally solid hydrocarbons during a production cycle by catalytic conversion of synthesis gas in a multiple reactor arrangement comprising at least two parallel operating reactors containing a catalyst capable of converting synthesis gas to hydrocarbons, and each reactor having a different relative reaction rate, wherein synthesis gas is distributed to each reactor at a feed rate proportional to the relative reaction rate in the respective reactor.

2. A process according to claim 1, wherein at least one of the reactors is a fixed bed reactor.

3. A process according to claim 1, wherein at least one of the reactors is a slurry reactor.

4. A process according to claim 1, wherein all reactors are fixed bed reactors or wherein all reactors are slurry reactors.

5. A process according to claim 1, wherein the reactor arrangement comprises at least one fixed bed reactor and at least one slurry reactor.

6. A process according to claim 1, wherein the catalyst comprises cobalt or iron on a carrier.

7. A process according to claim 1, wherein the catalyst is a Fischer-Tropsch catalyst.

8. A process according to claim 1, wherein from 20 to 80% by volume of the synthesis gas is fed to the reactor having the highest relative reaction rate, and the remainder is fed to reactors having a lower reaction rate.

9. A process according to claim 1, wherein the relative reaction rate in a reactor is determined by measuring the total carbon monoxide conversion per pass, or wherein the reaction rate in a reactor is determined by measuring the total reactor productivity for hydrocarbons having 5 or more carbon atoms at a given temperature and pressure.

10. A process according to claim 1, further comprising the steps of separating the obtained product mixture into normally liquid, solid and gaseous components, and subjecting the normally liquid, and/or normally solid products to hydroprocessing and/or catalytic dewaxing, and isolating n- and iso-paraffinic products from the reaction mixture.

* * * * *